E. HILL.
KNOB ATTACHMENT.
APPLICATION FILED JULY 1, 1908.
907,353.
Patented Dec. 22, 1908.
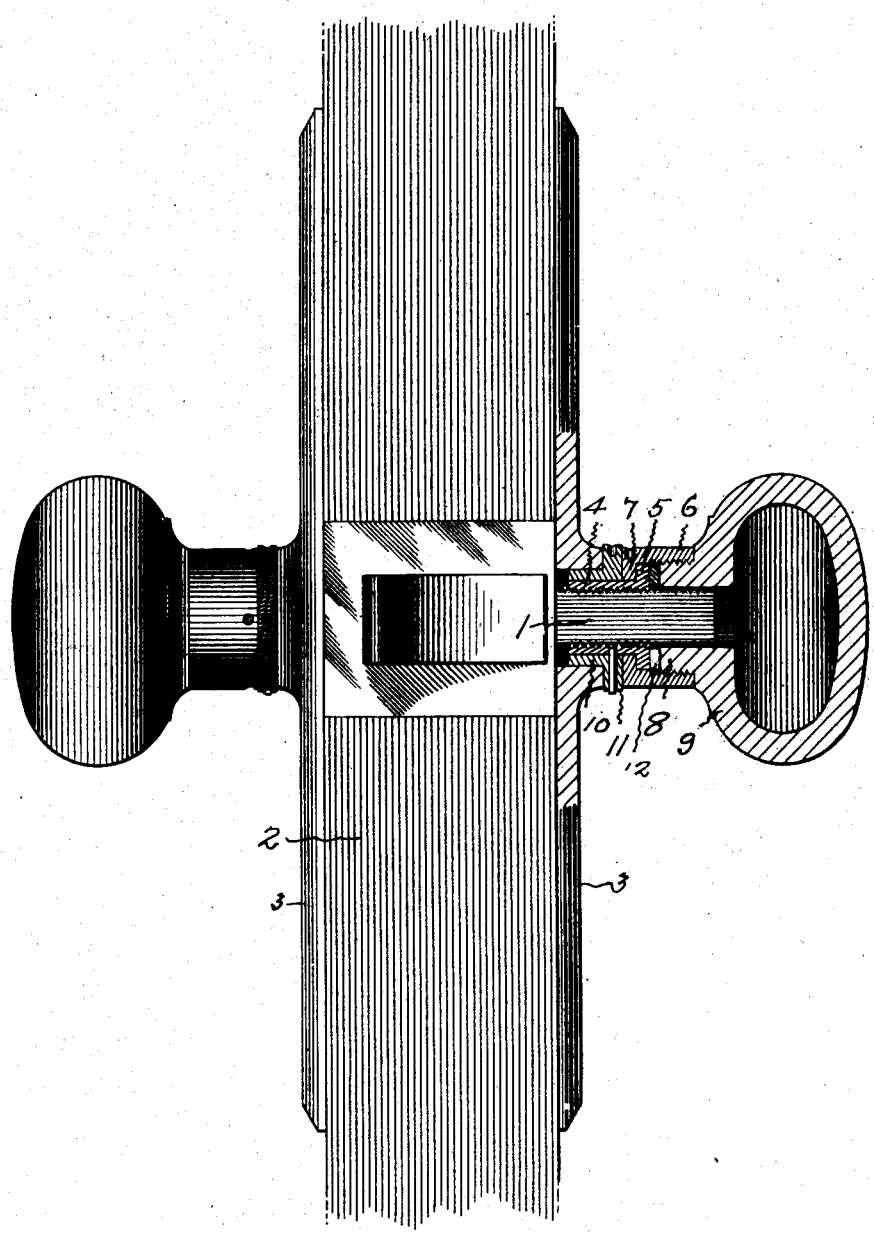
WITNESSES:
INVENTOR:

UNITED STATES PATENT OFFICE.

EBENEZER HILL, OF NORWALK, CONNECTICUT.

KNOB ATTACHMENT.

No. 907,353.     Specification of Letters Patent.     Patented Dec. 22, 1908.

Application filed July 1, 1908. Serial No. 441,273.

*To all whom it may concern:*

Be it known that I, EBENEZER HILL, a citizen of the United States, residing at Norwalk, in the county of Fairfield and State of Connecticut, have invented a new and useful Improvement in Knob Attachments, of which the following is a specification.

This invention relates to means for attaching knobs to lock and latch spindles and adjusting the knobs on the spindles so that they will properly fit the escutcheon plates on the doors.

The object of the invention is to provide a means which is simple to construct and apply, which is easy to adjust, and which holds the knobs very strongly and firmly when set.

The accompanying illustration shows an edge view of a door with knobs secured by means which embody this invention, one of the knobs and the means for securing and adjusting it upon the spindle being in central longitudinal section.

The spindle 1 is square in cross section as usual, and it extends through the door 2 and the escutcheon plates 3 in the ordinary manner. One or both knobs may be attached to the spindle by my improved means. To provide for the attachment of a knob by means of the present improvement the square spindle has its corners threaded, and turning upon this threaded section of the spindle is an interiorly threaded nut 4 which is circular in cross section, and which has at its outer end an annular exterior flange 5. Turning about the flanged end of the nut is a sleeve 6 which has an interior annular flange 7. This sleeve has an interior thread and fitting the threaded section of the sleeve is the threaded hub 8 of the knob 9, the central opening of which is square and loosely fits the square spindle. Fastened upon the exterior of the nut by driving, pinning or brazing, so as to secure the parts rigidly, is a collar 10. This collar has, inside of the flange of the sleeve, an exterior annular flange 11, the edge of which may be milled, knurled, or otherwise roughened or provided with holes by means of which it may be conveniently grasped for turning the collar and the nut.
A split spring washer 12 may be placed between the end of the hub of the knob and the flanged end of the nut for the purpose of increasing the tightness of the parts and locking them together.

In assembling this means the sleeve may be slipped upon the nut until the flanges engage, sufficient play being left so that the sleeve may be rotated, and then the collar may be put upon and secured to the nut with its flanged end adjacent to the flanged end of the sleeve. With these parts in this position, the spindle is thrust through the door and latch or lock case and the nut turned upon the threads of the spindle until the flange of the collar holds the spindle in the proper adjustment. After these parts are located the knob can be drawn upon the spindle by turning the sleeve on the threaded hub until the end of the hub is drawn firmly against the flanged end of the nut. This clamps the parts rigidly together and the knob cannot be loosened without turning the sleeve which is now bound between the flanged end of the collar on the nut. At any time the parts can be adjusted on the spindle so as to fit the door by loosening the sleeve and turning the nut by means of the flanged collar, after which the sleeve is again tightened.

The invention claimed is:

1. The combination with an angular spindle provided with screw threads, of a nut turning upon the threads and carrying two exterior flanges, a sleeve turning upon the nut and having a portion held between said flanges, said sleeve being interiorly threaded, and a knob having a central opening loosely fitting the spindle and a threaded hub fitting the threaded section of the sleeve, substantially as specified.

2. A knob attachment having an interiorly threaded nut carrying two exterior flanges, said nut being adapted to engage a threaded spindle, and a sleeve rotatable about the nut and having a portion held between the flanges, said sleeve having an interior screw thread, and adapted to engage a threaded knob hub, substantially as specified.

3. A knob attachment having an interiorly threaded nut with an exterior flange, said nut being adapted to engage a threaded spindle, a collar with an exterior flange secured to the nut, and a sleeve turning about the nut and having a flange held between the nut flange and collar flange, said sleeve having an interior thread and adapted to engage a threaded knob hub, substantially as specified.

4. A knob attachment having a knob, an interiorly threaded nut with an exterior flange, said nut being adapted to engage a threaded spindle, a collar with an exterior flange secured to the nut, a sleeve turning about the nut and having a flange held between the nut flange and the collar flange, said sleeve having an interior thread, and adapted to engage a threaded knob hub, and a spring washer between the nut flange and knob, substantially as specified.

EBENEZER HILL.

Witnesses:
J. E. SLATER,
S. M. STEVENS.